D. BICKFORD.
Knitting-Machine.
No. 6,424. Reissued May 11, 1875.
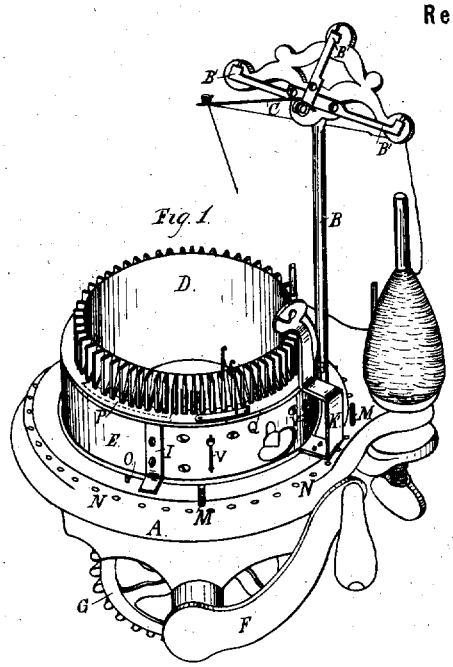
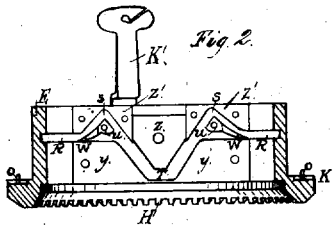
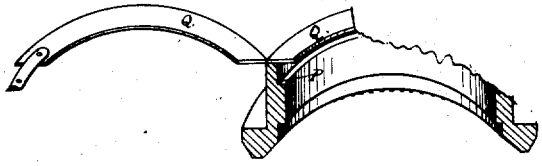
Witnesses.
Geo. T. Smallwood Jr.
John Roby Jr.
Inventor.
Dana Bickford,
By John J. Halsted
his Atty.
THE NORRIS PETERS CO., PHOTO-LITHO., WASHINGTON, D. C.

UNITED STATES PATENT OFFICE.

DANA BICKFORD, OF NEW YORK, N. Y.

IMPROVEMENT IN KNITTING-MACHINES.

Specification forming part of Letters Patent No. 92,146, dated July 6, 1869; reissue No. 6,424, dated May 11, 1875; application filed April 12, 1875.

*To all whom it may concern:*

Be it known that I, DANA BICKFORD, of the city and State of New York, formerly of Boston, Massachusetts, have invented certain Improvements in Knitting-Machines; and I do hereby declare that the following, taken in connection with the drawings, which accompany and form part of this specification, is a description of my invention sufficient to enable those skilled in the art to practice it.

My improvements relate chiefly to rotary knitting-machines, and are designed to perfect and facilitate their operations, especially for knitting in opposite directions upon reversing the movements; and they consist in the improvement of all parts of the machine. In my patent No. 80,121 I employed two stitch or draw-down cams and one throw-up cam, such construction allowing of a fixed yarn-carrier, but in my present invention I use but one stitch or draw-down cam and two throw-up cams, so that the latch of the needle can be freed in either direction. This stitch-cam I construct so as to have it act perfectly upon the needles in whichever direction the cylinder may be running. The throw-up cams are placed upon each side of the stitch-cam, and are so arranged as to drive up the needles and free the latches each way, so that they can be drawn down to form the next stitch. These throw-up cams I prefer to construct so that the forward one only shall act upon the needles to free the latch, leaving them held firmly by the loop of thread upon them until the needle is driven up to free the latch and the yarn is to be fed to the hook. This will prevent the flying up of the latch so as to drop stitches. I construct the draw-down cam substantially as hereinafter described. In the knitting of flat web or the heel and toe of socks the yarn must be fed to the needles opposite or a little forward of the forward throw-up cam, and as first one and then the other is forward, as the machine is reversed. This will necessitate the construction of the yarn-carrier so that it can be reversed or held in position while the cams are reversing, so as to bring first one and then the other into position. For this reason I have constructed this particular machine in the manner described, with the carrier attached to the sliding ring. I employ changeable stops for determining the distance to which the yarn-guide shall be shifted; and I also employ fixed stops on the cam-cylinder to check or limit the extent of its revolution to accord with the movement of the yarn-carrier.

In all machines heretofore made, so far as I am aware, the needles have been put in or taken out of action through a small groove in the cam-ring, which has been very inconvenient, for many reasons; and to obviate that difficulty I now propose to have the cam-cylinder made with spacious grooves or entirely cut away above the needle rest or groove. The part cut away may be the thickness or nearly so of the cam-groove or cams. This will leave the space unoccupied by the cams or switches entirely free from obstruction from the needle-rest up to the ring clamp or clasp, hereinafter named, so that one or many of the needles can be put in or out of the machine at a time. This feature is found to be of great importance.

My invention further consists in rounding the tops of the ribs or pillars which separate the needle-grooves, in order to prevent the cutting or breaking of the stitches of yarn, especially when knots or irregularities appear; and in a peculiar construction and application of automatic spring-switches in the cam-grooves, to compel the needles, at the commencement of each return movement of the cam-cylinder in either direction, to rise to their full height, to insure the rising of the latch above the loop on the needle, and the elevation of the hook, so that in its next descent it will seize the thread for the next loop or stitch.

In the drawings, Figure 1 represents a perspective view of my machine; Fig. 2, a cross-section of the cam-cylinder, giving a view of the cam-groove, self-acting switches, and adjustable central sliding piece; and Fig. 3 shows one-half of the cam-cylinder, having a portion cut away from the needle-rest to the ring-clasp.

A represents the frame of the machine, which, when desired, is constructed as shown, so as to be capable of being attached, by a clamp and thumb-screw, to a table top; or the clamping may be dispensed with, and the frame be secured in the center of the table, or supplied with legs reaching to the floor.

Upon that portion projecting over the ledge of the table are attached spindles, for the support of any desired number of bobbins, and also a corresponding number of slit-eyed thread-guides, each of which is furnished with an adjustable tension-device, B, and a self-acting spring take-up, for the slack-yarn, and which is marked C. Rising within the central part of frame A is the needle-ring D, firmly secured thereto. Surrounding this ring is the cam-cylinder E, and which is driven in a well-known manner by means of the crank F, toothed pinion G, and rack H, on the cam-cylinder. To this cylinder are firmly secured projections or stops I, for a purpose hereinafter mentioned, and which also serve in this case to keep in proper position the ring K. This ring, which carries the yarn-delivering guide, is not attached to the cam-cylinder, but is arranged to turn freely with or without it, in order to make the changes from one throw-up cam to the other.

It will be seen that where the carrier is attached to the ring K, it must be formed in a different shape from what it has been when it was directly attached to the top of the cylinder, as it must clear the working or adjustable parts of the machine, and for that reason it is constructed with the bend, as shown, and stand outward sufficiently to avoid coming in contact with any parts which would obstruct the shifting action; and at a point above this it is turned or bent inward, so as to bring its thread-delivering eye to the proper position in its relation to the needles.

M M represent movable stops or pegs, which fit into any of the circular series of holes N on the frame, and which holes correspond in number with the number of needles, and they are equidistant from each other. O O are stops fixed diametrically opposite each other upon the ring K, and which serve to arrest the motion of the cam-cylinder or carrier whenever either of the stops I shall come in contact with them, the stops M M allowing the changing of the relative positions of the cam-ring and the carrier, and the stops I and O determining the distance that either may move relatively to the other; the object of this travel of the cam-cylinder beyond the travel of the thread-guide being for the purpose of carrying the cams which actuate the needles far enough beyond the last needle of the series employed, to cause said cams, upon their return movement, to actuate properly the same needle, which now becomes the first of the course.

It must therefore have, through the medium of the stops, just the proper amount of additional traverse, and this will vary with the number of needles employed, and may be regulated by altering, as need be, the positions of pins or stops M. P P designate the spaces or rabbets cut away from the inner sides of the cam-cylinder, and extending part of the way down, reaching to the cam-groove, and which allow of the removal and insertion of many needles at once.

I prefer, however, to make these rabbets continuous all the way around the cylinder, and rely upon the weight of the knitted fabric, and the usual weight which is attached thereon, to keep the needles down upon the lower edge of the cam-surface; and by this construction, in connection with the removable pegs or stops, when used, I dispense with the necessity of removing these pegs or stops to bring the single narrow groove usually employed opposite the needle to be displaced, and also the necessity of replacing the pegs, with the risk of not replacing them in the same holes from which they are taken.

Q is the clasp or ring around the needles, which holds the needles in place. It may also serve to hold the cam-cylinder to its bed.

The top of the needle-cylinder, as heretofore made, is ground or made smooth horizontally, so as to be at sharp, right, or other angles with its vertical sides, and, when the needle-grooves have been made therein, it leaves the tops of the piers or ribs which separate the grooves with sharply-defined edges, which not only have a tendency to cut the yarn as the yarn is suddenly pulled over them upon the descent of the needles within the grooves, but also when knots or irregularities occur in the yarn. To prevent this entirely, I round off the top of each rib, and this is also productive of another result, namely, it enlarges the top opening of the groove to ease the entrance of the yarn or knots without enlarging the groove itself, or interferring with the action of the needles.

Upon the inner side of the cam-cylinder is a groove or rest, R, annular, as usual, for the most of its length, but having its needle-actuating parts made, as shown, with two elevating and one depressing curvatures, the former marked S S and the latter marked T. Within each of the elevated portions S of the groove is a switch, *u*, which acts automatically, as follows: Its pivot projects through the cylinder, and receives in a slit in its outer end a spring, V, supported, as shown, at one end. The force of this spring keeps the switches or latches in the positions shown at W, and which is their normal position.

Any form or arrangement of spring may be used, or the mere weight of the switch, if made heavy enough, will answer the same purpose, so long as the switch, after being lifted, is made to resume its place.

When the cylinder is revolved in either direction, the butts of the needles, as they ride along the straight part of the groove, and come to the edge of the switch, ride up and over it to the highest part of the groove; thence they descend to the lowest part, and again ascending a part of the distance on the opposite side, are ready to be similarly acted upon again. Z is a sliding adjustable piece, which, being raised or lowered, varies the degree of descent of the needles, and so permits the knitting of tight or loose work. Z′ Z′ are guides, which direct the needles to the draw-down cam, in whichever direction the machine may move. Y Y is a cam or cams for the purpose of guiding and forcing the needle back into the groove, and onto the rest, after the draw-down cam has taken it down and formed the stitch. This cam Y is also formed so as to permit of the machine being run freely in either direction.

The operation of the machine is as follows: When it is desired to knit less than a tube, and to revolve the machine partially, alternately in opposite directions, as many needles as would reach to both sides of the needle-operating cams in order to clear them, must be taken out of action. This number, as shown in the drawing, is twelve; and if the needles were smaller, and the cylinder of the same size, this number would be greater, and vice versa.

The stops M M are next adjusted the proper distance apart, to limit the movements of the thread-carrier, and the crank being turned, it will be found that the cam-cylinder will revolve no farther than has been previously determined, the yarn-guide being first stopped by M M, and the cylinder next stopped by O O. The crank is now reversed, and precisely the same operation takes place, the yarn-carrier being always carried to the proper distance to deliver its yarn to the first needle of the series, and the cam-cylinder being always carried the proper distance to operate the first needle of the series in the beginning of the next course of the stitches, the switches or throw-up cams always being in proper position to insure the freeing of the latch of the needles before the stitch-cams take them to form the stitch.

The stops or projections, it will be seen, determine the extent of traverse in either direction of the cam-cylinder, and also of the yarn-carrier.

When all the needles are in my machine, it knits tubular work continuously, whether revolved in one direction or the other.

I claim—

1. The draw-down cam Z of a rotary reversible family knitting-machine, substantially as described, combined with the guides Z Z′, all made and applied substantially as set forth.

2. In combination with the needle-cylinder, the cam-cylinder, provided with the stitch-cam, the switches, and the guides Z′, for bringing or keeping the needles in position as the machine reverses, to work properly to free the latch and form the stitch.

3. A rotary reversible cam-cylinder for a knitting-machine, provided with a stitch-cam, substantially such as described, and with automatic switches situated on opposite sides of such stitch-cam, whereby the needles first engaged by such switches are compelled to rise high enough to free the latch, as set forth.

4. The combination, with the cam-cylinder, of a yarn carrier or guide, constructed substantially as shown and described, whereby it may be changed in position from one side to the other of the stitch-cam, substantially as and for the purpose set forth.

5. In combination with the cam, grooved substantially as described, and with the bed-plate, provided with a series of holes, the adjustable pins or stops, and a shifting yarn-guide, substantially as and for the purpose set forth.

6. A needle ring or plate, the tops of whose walls or ridges between the needle-grooves are rounded off, substantially as and for the purpose described.

7. The combination of the bed-plate, the cam-ring, the reversible yarn-carrier, the stitch-cam, and the automatic switches, the combination being substantially as described.

8. The combination, with a revolving cam, grooved substantially as described, of a thread-carrier, held by friction on the cam-plate or ring, so as to be carried by it, and yet permit the latter to continue its motions after the carrier is at rest, substantially as set forth.

9. Stops, or their equivalents, and projections on the cylinder, for determining the extent of traverse in either direction of the cam-cylinder or yarn-carrier of a rotating knitting-machine.

10. The continuously-grooved cylinder, having spacious rabbets P, two similar needle-elevating cams, and two automatic switches, substantially as and for the purpose set forth.

DANA BICKFORD.

Witnesses:
JOHN ROBY, Jr.,
GEO. T. SMALLWOOD, Jr.